United States Patent [19]
Bellinger et al.

[11] Patent Number: 6,021,370
[45] Date of Patent: Feb. 1, 2000

[54] VEHICLE/ENGINE ACCELERATION RATE MANAGEMENT SYSTEM

[75] Inventors: Steven M. Bellinger, Columbus; John P. Kresse, Shelbyville; Matthew W. Workman, Indianapolis; John Shoemaker, Nashville, all of Ind.

[73] Assignee: Cummins Engine Company, Inc., Columbus, Ind.

[21] Appl. No.: 08/905,990

[22] Filed: Aug. 5, 1997

[51] Int. Cl.$^7$ .................................................. F02D 41/00
[52] U.S. Cl. ........................................................ 701/110
[58] Field of Search ............... 701/110, 93; 364/431.07, 364/431.08; 73/116, 118.1

[56] References Cited

U.S. PATENT DOCUMENTS

| | | | |
|---|---|---|---|
| 4,640,245 | 2/1987 | Matsuda et al. .......................... | 123/339 |
| 4,754,736 | 7/1988 | Yamato et al. ........................... | 123/492 |
| 4,870,586 | 9/1989 | Asakura et al. ....................... | 364/431.6 |
| 4,883,034 | 11/1989 | Yashiki et al. ........................... | 123/339 |
| 4,885,690 | 12/1989 | Schimmel et al. ..................... | 364/424.1 |
| 5,224,045 | 6/1993 | Stasell ................................. | 364/431.07 |
| 5,224,664 | 7/1993 | Adams, Sr. et al. .................. | 244/17.13 |
| 5,257,193 | 10/1993 | Kusaka et al. ....................... | 364/431.07 |
| 5,268,842 | 12/1993 | Marston et al. ...................... | 364/431.05 |
| 5,319,559 | 6/1994 | Kusaka et al. ....................... | 364/431.07 |
| 5,465,208 | 11/1995 | Mochizuki et al. ................. | 364/426.01 |
| 5,515,720 | 5/1996 | Remboski et al. ......................... | 73/116 |
| 5,528,500 | 6/1996 | Al-Charief et al. ............... | 364/431.01 |
| 5,532,929 | 7/1996 | Hattori et al. ...................... | 364/431.07 |
| 5,557,519 | 9/1996 | Morita ................................. | 364/424.01 |
| 5,559,705 | 9/1996 | McClish et al. .................... | 364/431.07 |
| 5,699,253 | 12/1997 | Puskorius et al. ................. | 364/431.08 |
| 5,715,726 | 2/1998 | Matsumoto et al. .................. | 73/118.1 |
| 5,726,892 | 3/1998 | Tang et al. .......................... | 364/431.07 |
| 5,749,063 | 5/1998 | Sakonjyu et al. ......................... | 701/93 |

Primary Examiner—Raymond A. Nelli
Attorney, Agent, or Firm—Beck, Michael & Beck, P.C.

[57] ABSTRACT

A vehicle/engine acceleration rate management system includes means for determining vehicle acceleration rate and a control computer providing a fueling signal to an internal combustion engine fueling system. The control computer is responsive to a gear ratio signal indicative of one of a plurality of selectable transmission gear ratios currently engaged with the engine and a vehicle acceleration rate signal to control the vehicle acceleration rate by limiting the fueling signal whenever the vehicle acceleration rate signal exceeds a vehicle acceleration limit function. In one embodiment, such vehicle acceleration rate limiting is performed only for vehicle speeds above a threshold vehicle speed, and an identical engine acceleration rate limiting procedure is performed at vehicle speeds below the threshold vehicle speed. In either case, such acceleration rate limiting is preferably only performed under manual control of engine fueling via an accelerator pedal or the like.

22 Claims, 8 Drawing Sheets

6,021,370

VEHICLE/ENGINE ACCELERATION RATE MANAGEMENT SYSTEM

FIELD OF THE INVENTION

The present invention relates generally to electronic control systems for internal combustion engines, and more specifically to such systems for controlling vehicle and/or engine acceleration rates.

BACKGROUND OF THE INVENTION

In motor vehicles equipped with electronically controlled engine fueling systems, vehicle operating parameters such as engine output power and vehicle road speed are typically controlled in accordance with engine fueling control algorithms. Such algorithms regulate engine output and road speed based on requested torque and other factors, wherein requested torque may be computer generated, such as in accordance with the operation of known motor vehicle cruise control systems, or may be manually generated via driver actuation of an accelerator pedal. The terms "torque request", "requested torque" and "torque request signal" as used hereinafter are defined as encompassing either "commanded throttle position", as this term is commonly understood in the spark ignited engine industry, or "commanded fueling rate", as this term is commonly understood in the compression ignition engine industry.

In many motor vehicle applications, particularly in the medium and heavy duty vehicle industries, vehicle and/or engine acceleration rates are important factors in determining engine fueling requirements. Such engine fueling requirements are therefore typically designed to ensure at least minimum vehicle acceleration rates under the most adverse conditions such as, for example, when over-the-road heavy duty trucks or industrial vehicles are hauling full cargo loads up steep inclines.

Designing engine fueling requirements in this manner, however, has drawbacks associated therewith. For example, designing engine fueling requirements to ensure minimum vehicle acceleration rates under adverse conditions also ensures that increasingly higher vehicle acceleration rates become available as the adverse conditions lessen in severity. At some point, available vehicle acceleration rates become excessive and begin to compromise fuel economy as well as engine/vehicle component integrity. It is well known in the motor vehicle industry that operating a vehicle with excessive vehicle acceleration can drastically reduce fuel economy in the short term, and decrease useful lifetimes of various vehicle and engine components in the long term.

What is therefore needed is a system for managing and controlling vehicle and/or engine acceleration rates. Such a system should ideally ensure adequate vehicle acceleration under adverse operating conditions while limiting vehicle and/or engine acceleration before such acceleration becomes excessive.

SUMMARY OF THE INVENTION

The foregoing shortcomings of the prior art are addressed by the present invention. In accordance with one aspect of the present invention, a vehicle acceleration rate management system comprises means for determining acceleration rate of a vehicle and producing a vehicle acceleration signal corresponding thereto, a memory storing a vehicle acceleration limit function therein, a fuel system responsive to a fueling signal to provide fuel to an internal combustion engine of the vehicle, and a control computer producing the fueling signal. The control computer is responsive to the vehicle acceleration signal and the vehicle acceleration limit function to control vehicle acceleration by limiting the fueling signal whenever the vehicle acceleration signal exceeds the vehicle acceleration limit function.

In accordance with another aspect of the present invention, an engine acceleration rate management system comprises means for determining an acceleration rate of an internal combustion engine and producing an engine acceleration signal corresponding thereto, a memory storing an engine acceleration limit function therein, a fuel system responsive to a fueling signal to provide fuel to the internal combustion engine, and a control computer producing the fueling signal. The control computer is responsive to the engine acceleration signal and the engine acceleration limit function to control engine acceleration by limiting the fueling signal whenever the engine acceleration signal exceeds the engine acceleration limit function.

In accordance with yet another aspect of the present invention, a vehicle/engine acceleration rate management system comprises means for sensing speed of a vehicle and producing a valid vehicle speed signal above a threshold vehicle speed and an invalid vehicle speed signal below the threshold vehicle speed, means responsive to the valid vehicle speed signal for producing a vehicle acceleration signal corresponding to an acceleration rate of the vehicle, means for producing an engine acceleration signal corresponding to an acceleration rate of an internal combustion engine of the vehicle, a fuel system responsive to a fueling signal to provide fuel to the internal combustion engine, and means responsive to the valid vehicle speed signal for controlling vehicle acceleration by accordingly limiting the fueling signal whenever the vehicle acceleration signal exceeds a vehicle acceleration limiting function, and further responsive to the invalid vehicle speed signal for controlling engine acceleration by correspondingly limiting the fueling signal whenever the engine acceleration signal exceeds an engine acceleration function.

In accordance with still another aspect of the present invention, a vehicle/engine acceleration rate management system comprises an accelerator responsive to manual actuation thereof to produce an accelerator signal, a fuel system responsive to a fueling signal to provide fuel to an internal combustion engine of a vehicle, and a control computer operable to generate a torque request signal independently of the accelerator signal. The computer is responsive to either of the accelerator signal and the torque request signal to produce the fueling signal and includes means for limiting the fueling signal to thereby limit acceleration of one of the vehicle and the internal combustion engine only when the fueling signal is produced in accordance with the accelerator signal.

One object of the present invention is to provide a system for managing and controlling the acceleration rate of a motor vehicle.

Another object of the present invention is to provide such a system operable to control vehicle acceleration rate as a function of a currently engaged transmission gear ratio.

Yet another object of the present invention is to provide such a system operable to control vehicle acceleration rate above a threshold vehicle speed and to control engine acceleration rate below the threshold vehicle speed.

A further object of the present invention is to provide such a system operable to control vehicle/engine acceleration rate only during manual control of engine fueling via an accelerator pedal.

Still another object of the present invention is to provide such a system responsive to either vehicle/engine acceleration or vehicle/engine speed to control vehicle/engine acceleration rates.

These and other objects of the present invention will become more apparent from the following description of the preferred embodiments.

DESCRIPTION OF THE PREFERRED EMBODIMENTS

Figure 1:
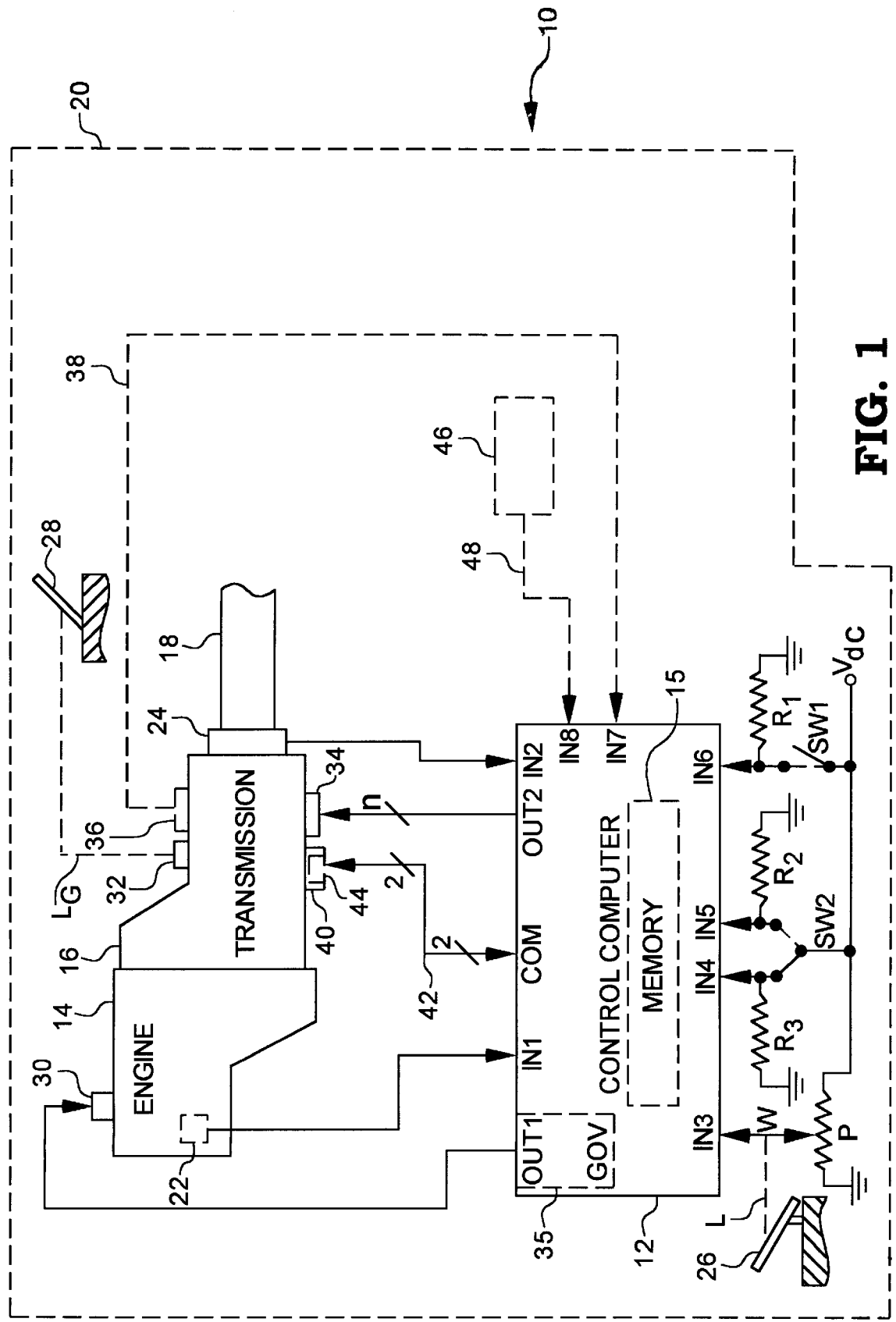
FIG. 1 is a diagrammatic illustration of a vehicle/engine acceleration management system in accordance with one aspect of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated devices, and such further applications of the principles of the invention as illustrated therein being contemplated as would normally occur to one skilled in the art to which the invention relates.

Referring now to FIG. 1, an engine control system 10 for managing and controlling vehicle and/or engine acceleration, in accordance with the present invention, is shown. Central to control system 10 is a control computer 12 which interfaces with various engine, vehicle and/or transmission components as will be more fully discussed hereinafter. Control computer 12 is preferably microprocessor-based and includes a memory portion 15, digital I/O, a number of analog-to-digital (A/D) inputs and at least one communications port (COM) such as a UART or DUART. The microprocessor portion of control computer 12 runs software routines and manages the overall operation of system 10 and is, in a preferred embodiment, a Motorolla 68336 or equivalent microprocessor. However, the present invention contemplates using any one of a number of known microprocessors capable of managing and controlling system 10.

The memory portion 15 of control computer 12 may include ROM, RAM, EPROM, EEPROM, FLASH MEMORY and any other reusable type memory known to those skilled in the art. Memory portion 15 may be further supplemented by external memory connected thereto (not shown).

An internal combustion engine 14 is operatively connected to a main transmission 16 as is known in the art. A propeller shaft, or tailshaft, 18 extends from transmission 16, whereby transmission 16 is operable to rotatably actuate propeller shaft 18 to thereby provide driving power to one or more vehicle wheels via a drive axle (not shown) as is known in the art. As is commonly known, particularly in the heavy duty tractor truck art, system 10 may further include one or more auxiliary transmissions and interconnecting propeller shafts (not shown), power take off (PTO) devices, and other known drivetrain components.

A number of sensors and actuators permit control computer 12 to interface with some of the various components of system 10 as well as other vehicle and engine systems. For example, engine 14 includes an engine speed sensor 22 mounted therein which is electrically connected to control computer 12 via input IN1. Engine speed sensor 22 is preferably a known Hall-Effect device operable to sense speed and/or position of a toothed gear rotating synchronously with the engine crank shaft. However, the present invention contemplates using any known engine speed sensor 22, such as a variable reluctance sensor, which is operable to sense engine rotational speed and provide a signal to control computer 12 corresponding thereto.

A vehicle speed sensor 24 is preferably operably connected to propeller shaft 18 and electrically connected to control computer 12 via input IN2. Vehicle speed sensor 24 is preferably a variable reluctance sensor operable to sense rotational speed of propeller shaft 18 and provide a vehicle speed signal to control computer 12 corresponding thereto. While vehicle speed sensor 24 is shown in FIG. 1 as being located adjacent to transmission 16, it is to be understood that sensor 24 may be located anywhere along propeller shaft 18. The present invention further contemplates using any other known vehicle speed sensor operable to provide a vehicle speed signal indicative of forward (and possibly reverse) vehicle velocity.

System 10 further includes an electronically controlled fueling system which is preferably responsive to a torque request signal provided by either operator actuation of an accelerator pedal 26 or a signal generated by control computer 12 pursuant to some type of computer controlled fueling condition as is known in the art. Examples of some well known computer controlled fueling conditions include, but are not limited to, cruise control operation, auto-starting of the vehicle, computer commanded fueling during auto-shifting or shift-assisting of the transmission 16, and the like. Additionally, a torque request signal could be provided by an auxiliary computer, and passed to control computer 12 via datalink 42, which will be discussed in greater detail hereinafter. In any event, the torque request signal, as it relates to the present invention, may be either an accelerator signal, defined hereafter as a signal provided to control computer 12 indicative of driver actutation of accelerator pedal 26, or a computer generated signal, defined hereafter as a signal generated by either control computer 12 or an auxiliary computer pursuant to some type of computer controlled fueling condition as described hereinabove.

Accelerator pedal 26 is preferably mechanically coupled via linkage L, to the wiper W of potentiometer P. The wiper W is connected to an analog-to-digital (A/D) converting input IN3 of control computer 12, and the position of accelerator pedal 26 corresponds directly to the voltage present on wiper W. One end of potentiometer P is connected to a voltage $V_{dc}$, and the other end is connected to ground potential. The voltage present on wiper W thus ranges between $V_{dc}$ and ground potential. Control computer 12 converts the analog voltage on wiper W to a digital quantity representative of driver requested torque. The present invention further contemplates that other known sensors may be alternatively associated with accelerator pedal 26 to provide one or more analog and/or digital signals corresponding to accelerator pedal position or pressure applied to accelerator pedal 26. In any event, control computer 12 processes the analog and/or digital accelerator signal(s) provided by accelerator pedal 26 to produce a torque request signal as described hereinabove.

The cruise control system preferably includes switches SW1 and SW2 which are mounted in the driver's cab or driver compartment. Switches SW1 and SW2 provide the driver with a means for turning the cruise control functions on and off via switch SW1 and for establishing a cruise speed via switch SW2. Switch SW2 also provides input signals to control computer 12 to activate resume/acceleration features well known in the art of cruise control systems. Switch SW1 thus enables cruise control mode of operation while switch SW2 is used to activate the operational modes of the cruise control system built into the software of control computer 12. Switch SW1 is connected at one end to $V_{dc}$, and at its opposite end to input IN6 of control computer 12 and resistor $R_1$, which is referenced at ground potential. Input IN6 is thus normally at ground potential while switch SW1 is open (cruise control "off"), while input IN6 switches to logic high voltage ($V_{dc}$) when switch SW1 is closed (cruise control "on"). Switch SW2 is a momentary center-off SPDT switch. The center position is connected to $V_{dc}$, a first switch position is connected to control computer input IN4 and resistor $R_3$, which is referenced at ground potential. The remaining position of switch SW2 is connected to control computer input IN5 and resistor $R_2$, which is also referenced at ground potential. The set/coast cruise control function is activated by shorting input IN4 of control computer 12 to logic high voltage, or $V_{dc}$. The resume/acceleration feature of the cruise control system is activated by shorting input IN5 of control computer 12 to logic high voltage $V_{dc}$. These operational features are activated by driver actuation of switch SW2 as is known in the art. While the foregoing description is directed to a preferred cruise control system embodiment, it is to be understood that the present invention contemplates using any cruise control system known to those skilled in the art. In any case, control computer 12 is responsive to the cruise control signals at inputs IN4–IN6 to determine therefrom a torque request signal as described hereinabove.

Regardless of the mechanism controlling the torque request signal, a governor portion 35 of control computer 12 is operable to process the torque request signal and provide an engine fueling signal therefrom, which fueling signal is provided at output OUT1. Output OUT1 is the output of the governor 35 and is connected to a fueling system 30 of the engine 14, wherein fueling system 30 may be any conventional fueling system known to those skilled in the art.

One preferred technique for converting the torque request signal to a fueling signal involves mapping the requested torque to an appropriate engine fueling rate stored in memory unit 15. While many factors other than requested torque affect the choice of engine fueling rate, the appropriate fueling rate information is converted to a corresponding timing signal provided to engine fueling system 30 via output OUT1. The present invention contemplates, however, that other known techniques may be used to convert the torque request signal to a timing signal suitable for use by engine fueling system 30. Further, those skilled in the art will recognize that control computer 12 typically includes an idle governor algorithm which is operable to maintain a steady engine speed with zero percent accelerator pedal actuation.

Transmission 16 may be any known manual, automatic or manual/automatic transmission having a plurality of selectable gear ratios. For any manually selectable gear ratios, transmission 16 includes a mechanical input 32 coupled, via mechanical linkage $L_G$, to a gear shift lever 28 typically located in the cab area of the vehicle. As is known in the art, gear shift lever 28 is manually actuatable to select any one of a plurality of manual gear ratios of transmission 16. For any automatically selectable gear ratios, transmission 16 includes one or more actuators 34 which is/are electrically connected to output OUT2 of control computer 12. As shown in FIG. 1, output OUT2 of control computer 12 is connected to the one or more automatic gear actuators 34 via n signal lines, where n is an integer value indicating one or more signal lines. Typically, the one or more automatic gear actuators 34 are electrically actuated solenoids which are responsive to control signals provided thereto to control selection of a corresponding automatic gear ratio of transmission 16.

System 10 may include various mechanisms for providing control computer 12 with information relating to the presently engaged gear ratio of transmission 16. Preferably, memory unit 15 of control computer 12 includes certain information relating to transmission 16, so that control computer 12 is operable to determine the presently engaged gear ratio of transmission 16 at any time the vehicle is moving at a speed sufficient to produce a valid speed signal by computing gear ratio as a ratio of engine speed (provided at input IN1) to vehicle speed (provided at input IN2), as is known in the art. However, the present invention contemplates several alternative techniques for determining the presently engaged gear ratio of transmission 16. For example, transmission 16 may include electrical componentry 36 which is operable to provide a signal to input IN7 of control computer 12 via signal path 38, which signal is indicative of the presently engaged gear ratio of transmission 16. In one embodiment, componentry 36 may include or interface with a number of microswitches associated with the various transmission gears. The collective states of the various switches may be used to provide a signal indicative of the presently engaged gear ratio. Alternatively, componentry 36 may include transmission input speed and output speed sensors and a processor operable to evaluate the transmission input and output speeds to provide a presently engaged gear ratio signal corresponding thereto. The present invention further contemplates that any known electrical componentry 36 may be used to provide control computer 12 with information relating to the presently engaged gear ratio of transmission 16.

As another alternative technique for determining the presently engaged gear ratio of transmission 16, transmission 16 may be equipped with circuitry 40 operable to determine the operational state or status of transmission 16, which circuitry may include a microprocessor 44. A communications bus 42 is connected at one end to a communications port of microprocessor 44, and at an opposite end to a communications port COM of control computer 12. Preferably communications bus or datalink 42 is an SAE (Society of Automotive Engineers) J1939 two-wire bus and operates in accordance with the technical specifications set forth in the SAE J1939 standard. According to the SAE J1939 bus industry standard, control computer 12 and microprocessor 44 are operable to send and receive information relating to engine, vehicle and/or transmission operation. Thus, all information available on communications bus 40 is available not only to control computer 12 but to microprocessor 44 as well.

Microprocessor 44 may use any information available on communication bus 42, or may use any of the electrical components within electrical circuitry 40, to determine the status of transmission 16, such as presently engaged gear ratio, out-of-gear condition, etc., in accordance with any of the previously discussed techniques. In one embodiment, microprocessor 44 may then transmit such gear ratio information over communication bus 42 to control computer 12 for further processing. Additionally, microprocessor 44 may, as discussed hereinabove, compute the torque request signal from appropriate data and/or signals provided thereto via datalink 42 and/or other inputs to microprocessor 44, and provide the torque request signal to control computer 12 via the datalink 42. It should further be understood that any auxiliary computer connected to datalink 42 would have access to any and all information necessary to compute the torque request signal, and could therefore compute this signal and provide it to control computer 12.

System 10 may optionally include an acceleration sensor/system 46 (shown in phantom in FIG. 1) attached to the vehicle 20 and electrically connected to input IN8 of control computer 12 via signal path 48. Acceleration sensor/system 46 is designed with sufficient sensitivity to provide control computer 12 with one or more signals indicative of vehicle acceleration resulting from driver actuation of accelerator pedal 26. Acceleration sensor/system 46 may be any known accelerometer or acceleration sensing system capable of providing control computer 12 with appropriate vehicle acceleration information.

Figure 2:
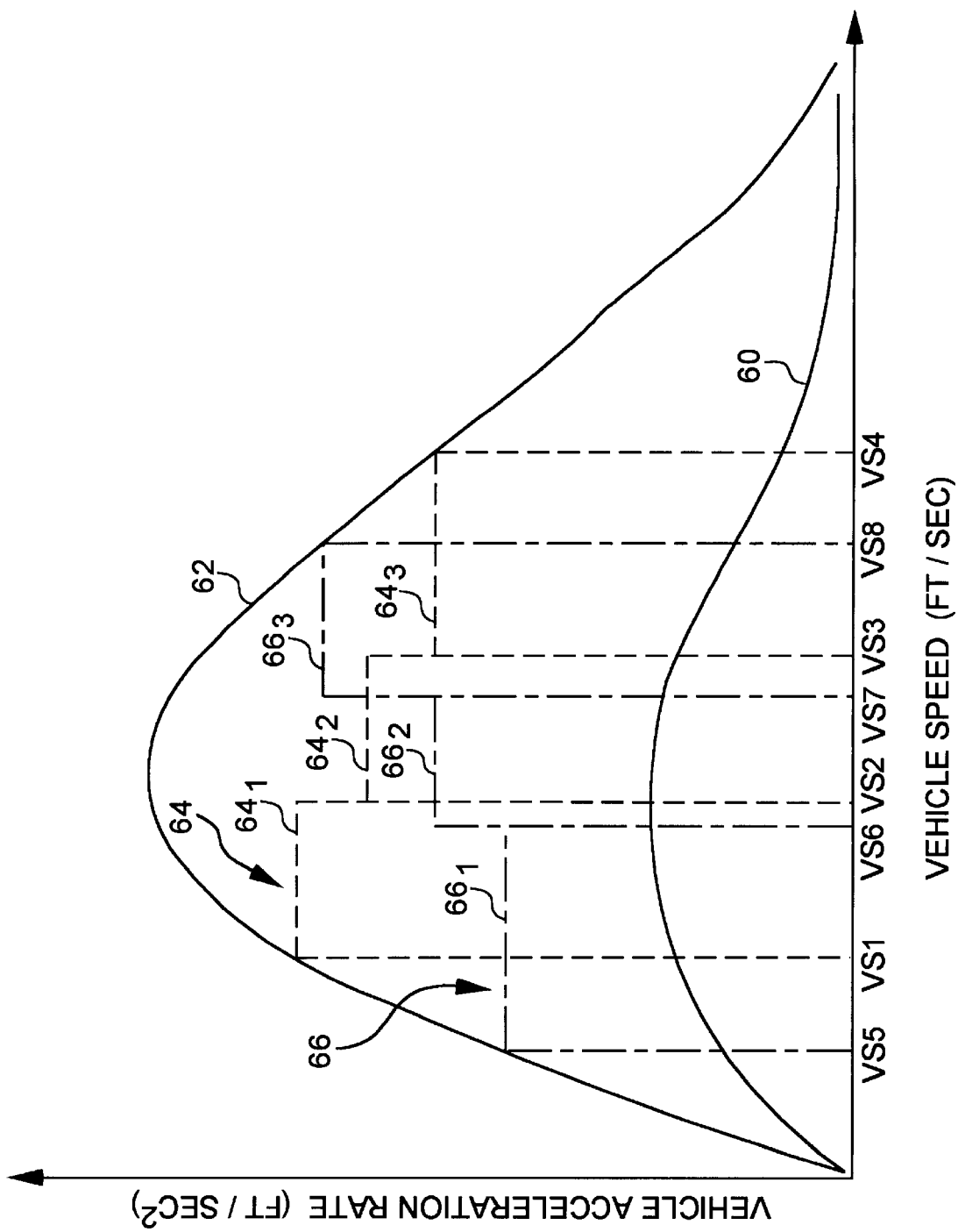
FIG. 2 is a plot of vehicle acceleration versus vehicle speed illustrating limiting thereof in accordance with the present invention.

Referring now to FIG. 2, a plot of vehicle acceleration versus vehicle speed is shown to illustrate some of the concepts of the present invention. As discussed in the BACKGROUND section, engine fueling rates in many motor vehicles are typically designed to allow for at least some minimum vehicle acceleration under the most adverse conditions, such as when transporting a full cargo load up a steep incline. An example of such a minimum vehicle acceleration is illustrated in FIG. 2 by curve 60. However, with engine fueling rates designed to provide the minimum vehicle acceleration rate of curve 60, such a vehicle will be capable of excessive vehicle acceleration rates when such adverse conditions are no longer present, such as when transporting no cargo or trailer on a flat or declined road. An example of such excessive acceleration is illustrated in FIG. 2 by curve 62.

In accordance with one embodiment of the present invention, system 10 addresses this condition by determining an acceleration rate of the vehicle and limiting the engine fueling rate whenever the vehicle acceleration rate exceeds a predefined vehicle acceleration function. The present invention contemplates that the predefined vehicle acceleration function may be any continuous or piecewise continuous increasing function, any continuous or piecewise continuous decreasing function or a constant function, wherein any of the foregoing functions may be defined within any one or more vehicle speed ranges. One example of a predefined vehicle acceleration function is illustrated in FIG. 2 by curve 64. Specifically, curve 64 represents a decreasing step function wherein a first constant vehicle acceleration limit $64_1$ is defined between vehicle speeds $VS_1$ and $VS_2$, a second reduced constant vehicle acceleration limit $64_2$ is defined between vehicle speeds $VS_2$ and $VS_3$, and a third further reduced constant vehicle acceleration limit $64_3$ is defined between vehicle speeds $VS_3$ and $VS_4$. Another example of a predefined vehicle acceleration function is illustrated in FIG. 2 by curve 66. Specifically, curve 66 represents an increasing step function wherein a first constant vehicle acceleration limit $66_1$ is defined between vehicle speeds $VS_5$ and $VS_6$, a second increased constant vehicle acceleration limit $66_2$ is defined between vehicle speeds $VS_6$ and $VS_7$, and a third further increased constant vehicle acceleration limit $66_3$ is defined between vehicle speeds $VS_7$ and $VS_8$. Such vehicle acceleration functions are stored in memory 15, preferably in the form of a look up table, so that for any vehicle speed, control computer 12 may retrieve a desired vehicle acceleration limit from memory for comparison with the actual vehicle acceleration rate.

It is to be understood that the predefined acceleration function may alternatively be stored in memory 15 in the form of an equation or function, wherein control computer 12 may, for any vehicle speed, compute a vehicle acceleration limit for comparison with the actual vehicle acceleration rate. In this manner, any desired shape and vehicle speed range of a predefined acceleration limit function may be defined by one or more mathematical equations executable by control computer 12 or by other known circuitry under the control of control computer 12. Preferably, the predefined acceleration limit function, whether in the form of a look up table, one or more mathematical equations, or other known function storage technique, is programmable via a known service/recalibration tool.

The present invention recognizes that vehicle acceleration rates may vary widely depending upon the currently engaged gear ratio, particularly in heavy duty and industrial truck applications. As such, system 10 is preferably responsive to both the detected vehicle acceleration rate and currently engaged gear ratio (or alternatively current vehicle speed) to modify engine fueling rates as discussed above, wherein currently engaged gear ratio may be determined in accordance with any of the techniques described hereinabove. In one embodiment, the present invention accomplishes this by partitioning the predefined acceleration limit function within memory 15 into one or more look up tables or equations, each corresponding to one or more of the selectable transmission gear ratios. Memory 15 may, according to the present invention, include separate acceleration limit functions for each of the selectable gear ratios, or may contain acceleration limit functions for groups of selectable gear ratios. In some applications, however, one acceleration limit function may be desirable for all selectable gear ratios, and the present invention contemplates providing for such a single acceleration limit function within memory 15.

In another embodiment, memory 15 includes a "parent" vehicle acceleration limit function, and control computer 12 is operable to modify this parent function with a gear ratio modifier depending upon the currently engaged gear ratio. Those skilled in the art will recognize other alternative techniques for utilizing currently engaged gear ratio information to further modify engine fueling rates in order to achieve desired vehicle acceleration limits, and that such alternative techniques fall within the scope of the present invention. Moreover, regardless of the technique implemented for utilizing currently engaged gear ratio information to further modify engine fueling rates in order to achieve desired vehicle acceleration rates, and regardless of the predefined vehicle acceleration limit function, the present invention preferably provides for at least some minimum engine fueling rate to allow for gear synchronization during "out-of-gear" or "driveline disengaged" conditions. It should thus be understood that care should be exercised in implementing the vehicle acceleration limiting concepts of the present invention to allow for adequate engine fueling during gear shifting operations.

Figure 3A:
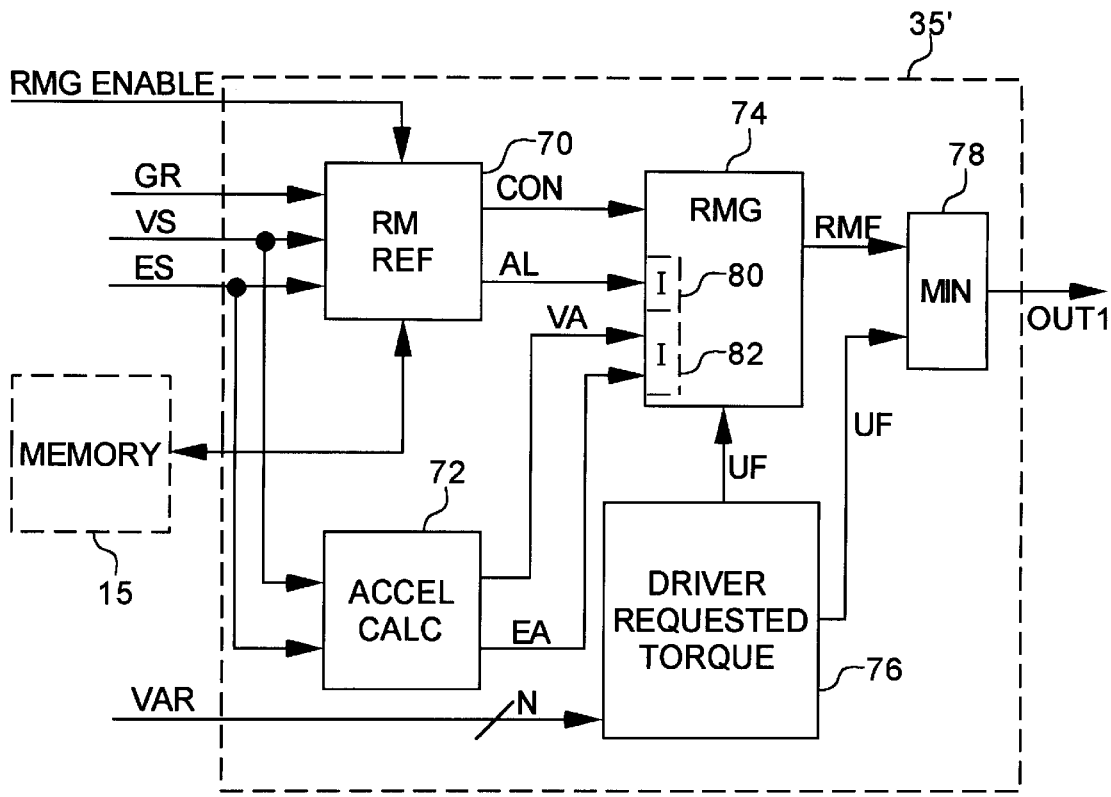
FIG. 3A is a diagrammatic illustration of one preferred embodiment of the governor portion of the control computer illustrated in the system of FIG. 1.
Figure 3B:
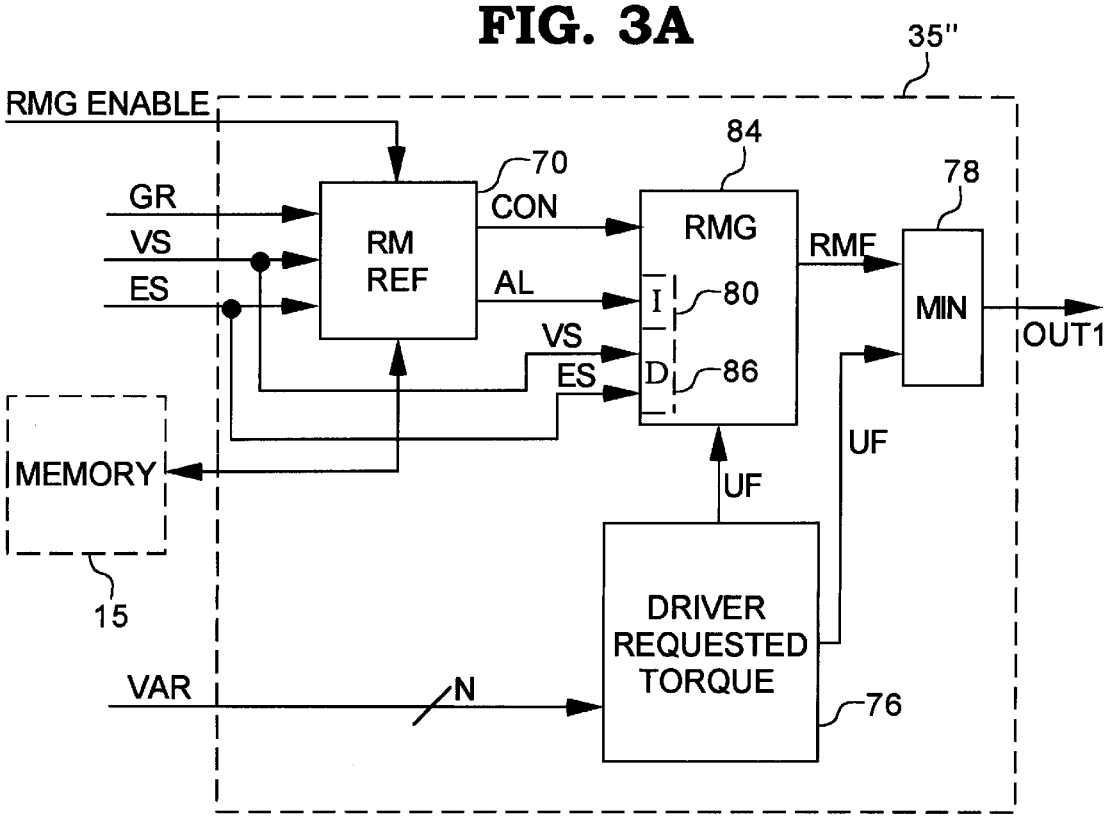
FIG. 3B is a diagrammatic illustration of an alternate embodiment of the governor portion of the control computer illustrated in the system of FIG. 1.
Figure 3C:
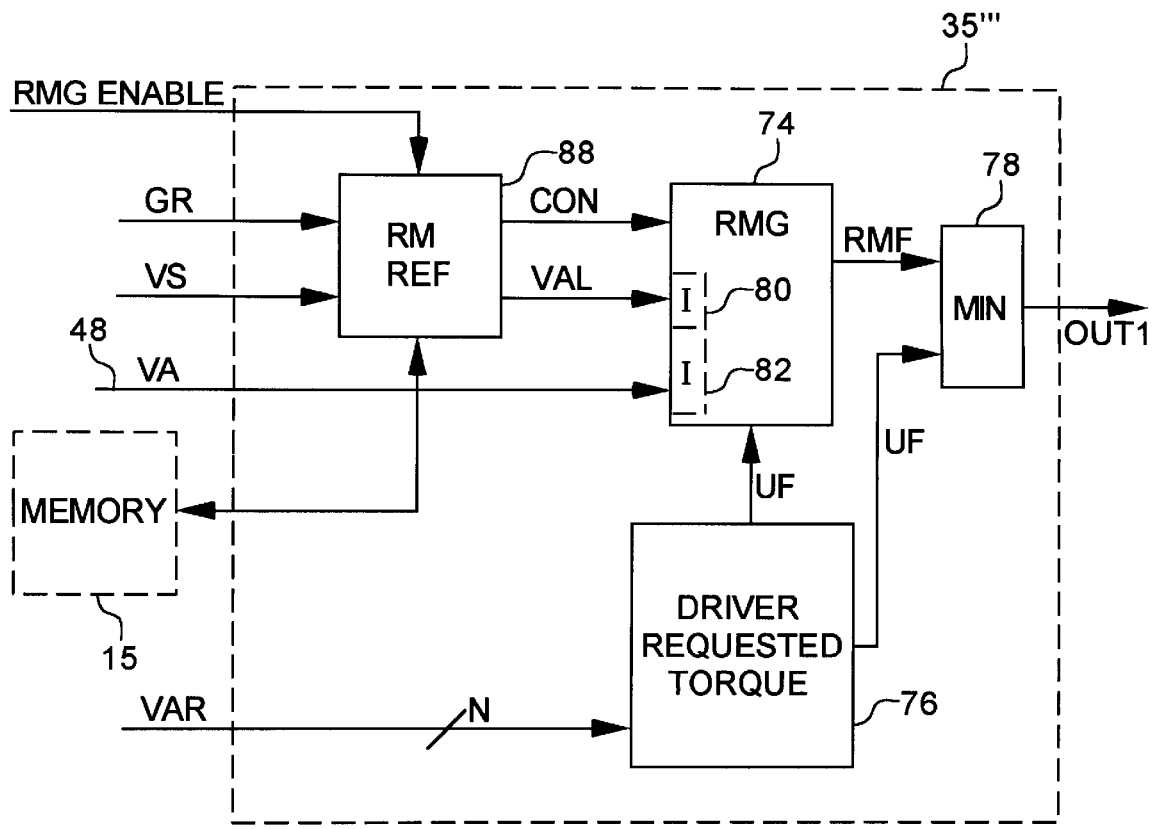
FIG. 3C is a diagrammatic illustration of another alternate embodiment of the governor portion of the control computer illustrated in the system of FIG. 1.

Referring now to FIGS. 3A–3C, three alternative embodiments of the governor 35 of FIG. 1, in accordance with the present invention, are shown. It is to be understood that the governor embodiments illustrated in FIGS. 3A–3C, while they may be implemented with known discrete and/or integrated circuitry, are intended to illustrate functional blocks of control computer 12. Those skilled in the art will recognize that such functional blocks may be easily implemented, via suitable software, in control computer 12.

Referring specifically to FIG. 3A, one preferred embodiment 35' of the governor 35 of FIG. 1 is shown. Governor 35' includes a rate management reference block (RM REF) 70 having inputs receiving a currently engaged gear ratio signal (GR), present vehicle speed (VS), present engine speed (ES) and rate management governor enable signal (RMG ENABLE). RM REF 70 is further connected to memory 15 for communication therewith. RM REF 70 provides a control signal (CON) and an acceleration limit signal (AL) to two corresponding inputs of a rate management governor (RMG) block 74.

Vehicle speed and engine speed signals VS and ES are also provided to an acceleration calculation block 72 which is operable to compute vehicle acceleration (VA) and engine acceleration (EA) therefrom in accordance with well known equations. The vehicle and engine acceleration signals, VA and EA, are provided to corresponding inputs of RMG 74. RMG 74 preferably includes integration blocks 80 and 82 at the AL, VA and EA inputs respectively for selective integration of the AL, VA and/or EA signals as will be discussed more fully hereinafter. RMG 74 provides a rate management fueling signal RMF to one input of a comparison block 78.

Any integer number, N, of various known signals (VAR) are provided to a Driver Requested Torque Block 76, as is known in the art, wherein block 76 processes such signals and determines therefrom an engine fueling rate, which block 76 provides as a user fueling signal, UF. In one embodiment, the Driver Requested Torque block 76 is a known all speed governor, although the present invention contemplates that block 76 may alternatively be any functional block that converts the accelerator signal provided by accelerator pedal 26 to the torque request signal discussed hereinabove, such as a look up table. Examples of VAR signals include, but are not limited to, vehicle speed, engine speed, accelerator pedal deflection percentage and the like, as is known in the art. In any event, block 76 provides the user fueling signal UF to another input of the RMG block 74 and to a second input of the comparison block 78. Preferably, comparison block is configured to pass, as the output signal OUT1 discussed with reference to FIG. 1, the minimum value of the RMF and UF signals.

Referring now to FIG. 3B, an alternate embodiment 35" of the governor 35 illustrated in FIG. 1, is shown. Governor 35" is identical in many respects to governor 35', and like numbers are therefore used to identify like elements. Unlike governor 35', however, governor 35" has acceleration calculation block 72 omitted therefrom. Instead, the vehicle speed and engine speed signals VS and ES respectively are fed directly to corresponding inputs of RMG 84. RMG 84 is identical to RMG 74 of FIG. 3A except that integration block 82 is replaced with a differentiation block 86. In all other respects, governor 35" is identical to governor 35'. It also bears pointing out that although the Driver Requested Torque Block 76 is shown separately from the rate management governor 74 (or 84) in FIGS. 3A–3C, it will be recognized that, as a practical matter, these two blocks may alternatively be combined into a single governor block, which may further also include comparison block 78.

In accordance with a preferred embodiment of the present invention, the vehicle acceleration limiting operation is enabled only when the accelerator signal provided by accelerator pedal 26 is the predominant factor used by the Driver Requested Torque Block 76 in generating the user fueling signal UF. Thus, RMG is enabled only when the torque request signal supplied to governor 35 is dominated by the accelerator signal provided by accelerator pedal 26, and is disabled when the torque request signal supplied to governor 35 is dominated by a computer generated signal generated by control computer 12 or other auxiliary computer pursuant to a computer commanded fueling request such as cruise control, computer commanded fueling during an auto-shift, or the like. However, the present invention alternatively contemplates providing for RMG 74 operation during at least some computer commanded fueling events such as, for example, during cruise control operation.

Figure 4:
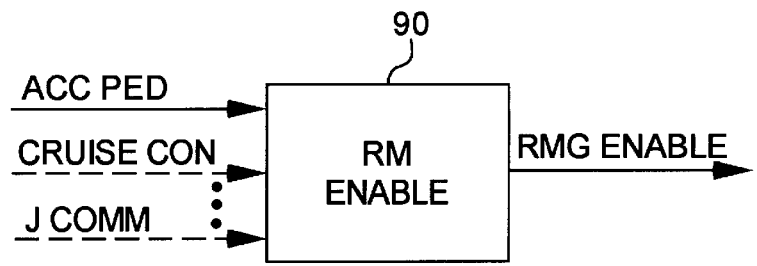
FIG. 4 is a diagrammatic illustration of one preferred embodiment of a portion of the control computer illustrated in FIG. 1 for controlling enablement of the rate management governor of the present invention.

Referring to FIG. 4, a rate management enable (RM ENABLE) functional block 90 is shown illustrating one preferred technique for providing the RMG ENABLE signal to RM REF block 70. Preferably, RM ENABLE block 90 includes inputs receiving the accelerator signal (ACC PED), cruise control signal (CRUISE CON), a signal, JCOMM, provided to control computer 12 over the J1939 bus 42 (FIG. 1) and indicating the current status of transmission gear engagement, and any other signals having a bearing on the generation by control computer 12 of the torque request signal supplied to block 76. As is known in the art, the JCOMM signal provides control computer 12 with information relating to the present gear engagement state of the transmission, and therefore provides computer 12 with an indicator of whether engine fueling rates are presently being computer commanded pursuant to an auto-shift or the like. In any case, RM ENABLE block is operable to compare all input signals and provide an active RMG ENABLE signal, thereby activating the acceleration rate management technique of the present invention, only when the ACC PED signal is the predominant factor used by block 76 in generating the user fueling signal UF, and otherwise provide an inactive RMG ENABLE signal, thereby disabling the acceleration rate management technique of the present invention. In one embodiment, the RMG ENABLE signal may be programmed by a known service/recalibration tool to either allow for enablement of the acceleration rate management technique of the present invention or to completely disable this feature.

Referring again to FIG. 3A, RM REF 70 is responsive to an inactive RMG ENABLE signal to provide a control signal CON indicating that no rate management governing is desired, in which case the RMG 74 sets RMF=UF. The comparison block 78 will therefore provide, as output signal OUT1, the user fueling signal UF. Conversely, RM REF 70 is responsive to an active RMG ENABLE signal to provide a control signal CON indicating that rate management governing is desired, in which case RM REF 70 is operable to determine a current vehicle speed from the input signal VS, a currently engaged gear ratio from the input GR, and retrieve an appropriate vehicle acceleration limit function from memory 15 in accordance with any of the techniques described hereinabove. The current vehicle acceleration limit value is provided to RMG 70 as the signal AL.

Preferably, the CON signal is programmable via a service/recalibration tool, to instruct RMG 74 (or 840 to be responsive to either a vehicle acceleration signal or a vehicle speed signal in governing vehicle acceleration rates. If programmed to be responsive to a vehicle acceleration signal, integration blocks 80 and 82 are disabled and RMG is operable to compare the current vehicle acceleration rate (VA) with the current vehicle acceleration limit value (AL). If VA is less than or equal to AL, RMG 70 sets RMF=UF, and the user fueling signal UF is therefore supplied by governor 35' as the output signal OUT1. If, however, VA exceeds AL, RMG 70 modifies the UF signal to a reduced value of engine fueling at which vehicle acceleration for the current vehicle speed and engaged gear ratio will not exceed AL, and sets RMF equal to the so modified UF signal. At comparison block 78, since the RMF signal is less than the UF signal, comparison block 78 will accordingly provide the rate management fueling signal RMF as the output signal OUT1. In this manner, engine fueling rates are controlled to thereby control and manage vehicle acceleration rates.

If RMG is programmed, via the CON signal, to be responsive to the vehicle speed signal, integration blocks 80 and 82 are enabled and are operable to convert the current vehicle acceleration rate value (VA) and the current vehicle acceleration limit value (AL) to a current vehicle speed value (VS) and current vehicle speed limit value (VSL) respectively. If VS is less than or equal to VSL, RMG 70 sets RMF=UF, and the user fueling signal UF is therefore supplied by governor 35' as the output signal OUT1. If, however, VS exceeds VSL, RMG 70 modifies the UF signal to a reduced value of engine fueling at which the vehicle speed at the currently engaged gear ratio will not exceed VSL, and sets RMF equal to the so modified UF signal. At comparison block 78, since the RMF signal is less than the UF signal, comparison block 78 will accordingly provide the rate management fueling signal RMF as the output signal OUT1.

Referring to FIG. 3B, governor 35" is nearly identical in operation to that described with respect to FIG. 3A with a few minor exceptions. For example, if RMG 84 is programmed, via the CON signal, to be responsive to the vehicle acceleration signal integration block 80 is disabled and differentiation block 86 is enabled to thereby convert the VS signal to a VA signal as described above, and provide RMG 84 with AL and VA signals for processing as described above. Conversely, if RMG 84 is programmed, via the CON signal, to be responsive to the vehicle speed signal, integration block 80 is enabled and differentiation block 86 is disabled to thereby convert the AL signal to VSL signal as described above, and provide RMG 84 with VSL and VS signals for processing as described above.

With either of the governor embodiments 35' and 35" illustrated in FIGS. 3A and 3B and describe hereinabove, vehicle acceleration is computed from a vehicle speed signal originated by vehicle speed sensor 24 (FIG. 1). However, many vehicle speed sensors do not provide a valid vehicle speed signal until actual vehicle speed exceeds a threshold value $VS_{THRESH}$, which may typically between within the range of 7–12 mph. At vehicle speeds below $VS_{THRESH}$, the vehicle speed signal VS may therefore be invalid and control computer 12 is resultingly unable to compute a valid vehicle acceleration value. Moreover, if control computer 12 is configured to compute currently engaged gear ratio as a ratio of engine speed to vehicle speed, control computer is similarly unable to compute a valid gear ratio at vehicle speeds below $VS_{THRESH}$. The present invention addresses this problem with the governor embodiments 35' and 35" by switching the RMG 74 (or 84) to be responsive to either an engine acceleration signal or engine speed signal, as dictated by the CON signal, to thereby govern engine acceleration rates.

In one preferred embodiment, the threshold vehicle speed value $VS_{THRESH}$ is a value that is "learned" by monitoring the vehicle speed sensing device and setting $VS_{THRESH}$ equal to the lowest valid vehicle speed value. In this manner, the acceleration rate management technique of the present invention is readily adaptable to any vehicle speed sensing system. Thus, control computer 12 preferably includes an algorithm that monitors VSS 24, either one time during initial vehicle operation or periodically, "learns" $VS_{THRESH}$ as is known in the art, and stores the learned value of $VS_{THRESH}$ in memory 15 for later recall.

Referring again to FIG. 3A, RM REF 70 is preferably operable to monitor VS and, if VS drops below $VS_{THRESH}$, thereby indicating an invalid vehicle speed signal, RM REF 70 switches CON from a vehicle acceleration instruction signal to an engine acceleration instruction signal. For example, if the vehicle speed signal VS is less than $VS_{THRESH}$ and the CON signal has been set such that RMG 74 is to be responsive to the vehicle acceleration signal, RM REF 70 resets the signal so that RMG 74 is to be responsive to the engine acceleration signal. In the engine acceleration governing mode, memory 15 preferably contains engine acceleration limit functions according to any of the techniques described above with respect to the vehicle acceleration limit functions. If control computer 12 does not require the vehicle speed signal VS to compute currently engaged gear ratio, then memory 15 may include several engine acceleration limit functions corresponding to the various selectable gear ratios as described hereinabove with respect to the vehicle acceleration limit functions. Conversely, if control computer 12 does require the vehicle speed signal VS to compute the currently engaged gear ratio, then at vehicle speeds below $VS_{THRESH}$, currently engaged gear ratio information may not available and control computer therefore preferably assumes that the numerically lowest of the selectable gear ratios is currently engaged. In any event, if RMG 74 is programmed, via the CON signal, to be responsive to the engine acceleration signal, integration blocks 80 and 82 are disabled and RMG is operable to compare the current engine acceleration rate (EA) with the current engine acceleration limit value (AL). If EA is less than or equal to AL, RMG 74 sets RMF=UF, and the user fueling signal UF is therefore supplied by governor 35' as the output signal OUT1. If, however, EA exceeds AL, RMG 70 modifies the UF signal to a reduced value of engine fueling at which engine acceleration for the currently engaged (or assumed) gear ratio will not exceed AL, and sets RMF equal to the so modified UF signal. At comparison block 78, since the RMF signal is less than the UF signal, comparison block 78 will accordingly provide the rate management fueling signal RMF as the output signal OUT1. In this manner, engine fueling rates are controlled to thereby control and manage engine acceleration rates at vehicle speeds below $VS_{THRESH}$.

If RMG 74 is programmed, via the CON signal, to be responsive to the engine speed signal, integration blocks 80 and 82 are enabled and are operable to convert the current engine acceleration rate value (EA) and the current engine acceleration limit value (AL) to a current engine speed value (ES) and current engine speed limit value (ESL) respectively. If ES is less than or equal to ESL, RMG 70 sets RMF=UF, and the user fueling signal UF is therefore supplied by governor 35' as the output signal OUT1. If, however, ES exceeds ESL, RMG 70 modifies the UF signal to a reduced value of engine fueling at which the engine speed at the currently engaged (or assumed) gear ratio will not exceed ESL, and sets RMF equal to the so modified UF signal. In comparison block 78, since the RMF signal is less than the UF signal, comparison block 78 will accordingly provide the rate management fueling signal RMF as the output signal OUT1.

The governor 35" of FIG. 3B is similarly operable to be responsive to either the engine acceleration signal or engine speed signal in managing engine acceleration rates. If RMG 84 is programmed, via the CON signal, to be responsive to the engine acceleration signal, integration block 80 is disabled and differentiation block 86 is enabled to thereby convert the ES signal to an EA signal as described above, and provide RMG 84 with AL and EA signals for processing as described above. Conversely, if RMG 84 is enabled, via the CON signal, to be responsive to the engine speed signal, integration block 80 is enabled and differentiation block 86 is disabled to thereby convert the AL signal to an ESL signal as described above, and provide RMG 84 with ESL and ES signals for processing as described above.

Figure 5:
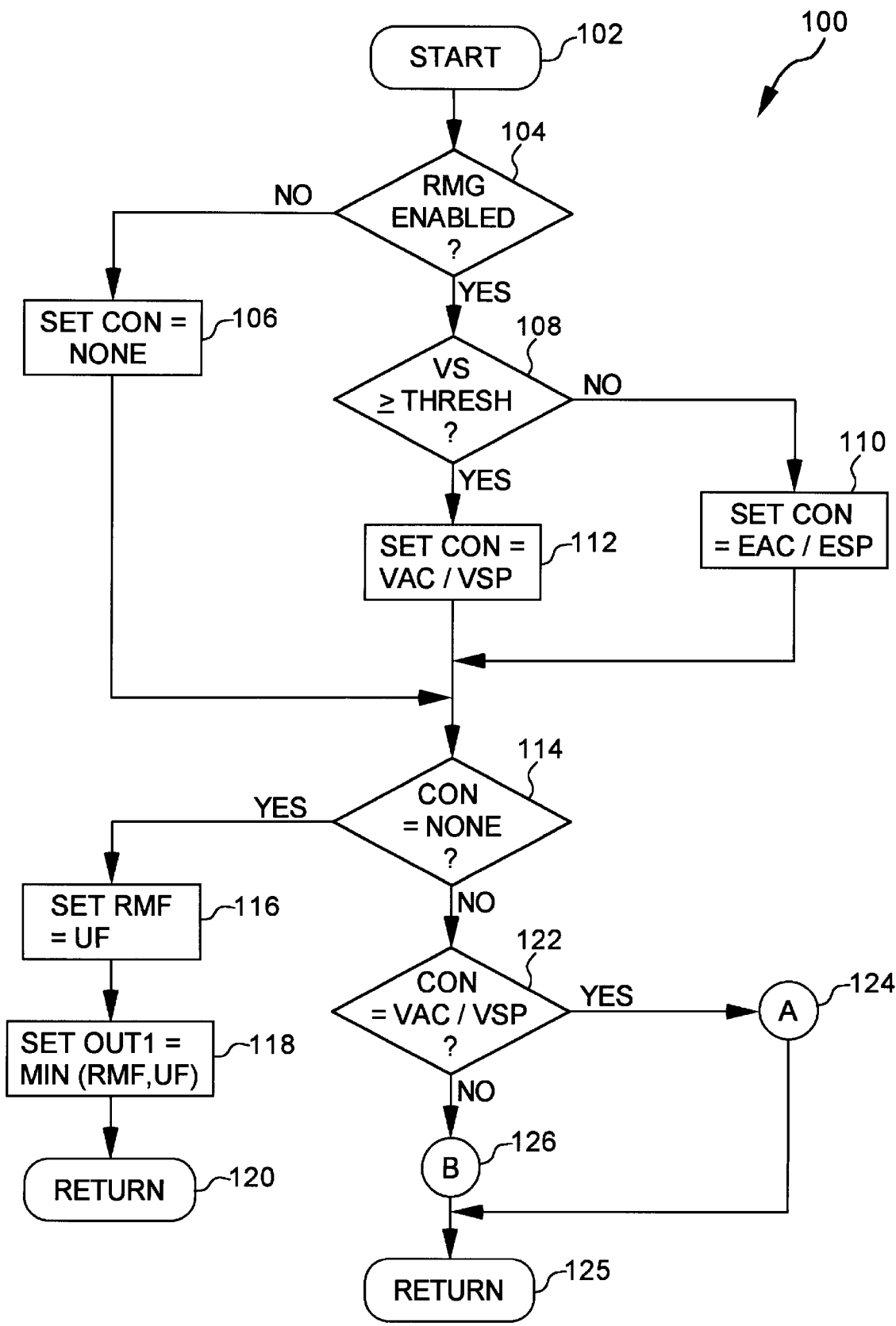
FIG. 5 is a flowchart illustrating one preferred embodiment of a software algorithm executable by the control computer of FIG. 1 for controlling vehicle/engine acceleration in accordance with the present invention.
Figure 6:
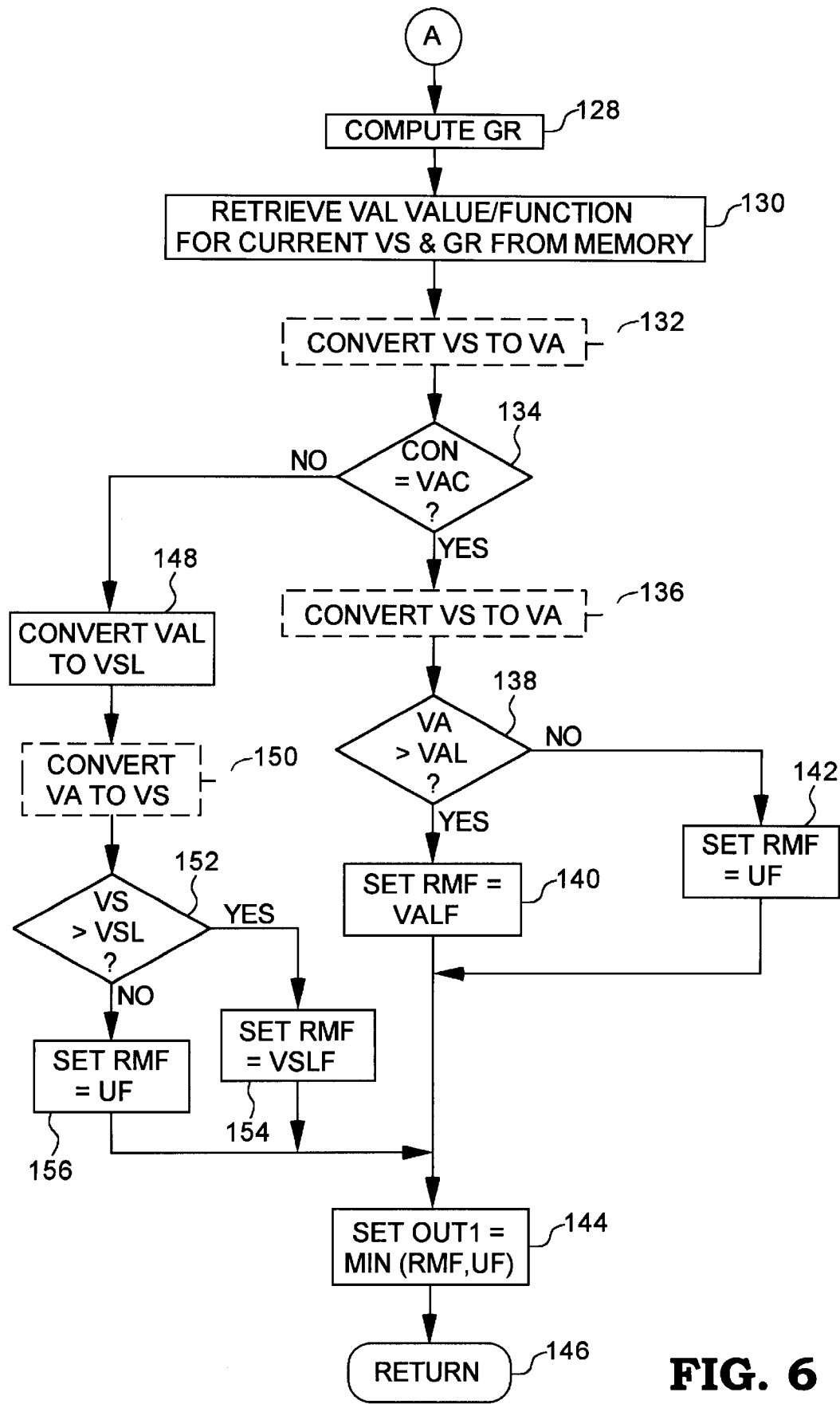
FIG. 6 is a flowchart illustrating one preferred embodiment of subroutine A of FIG. 5.
Figure 7:
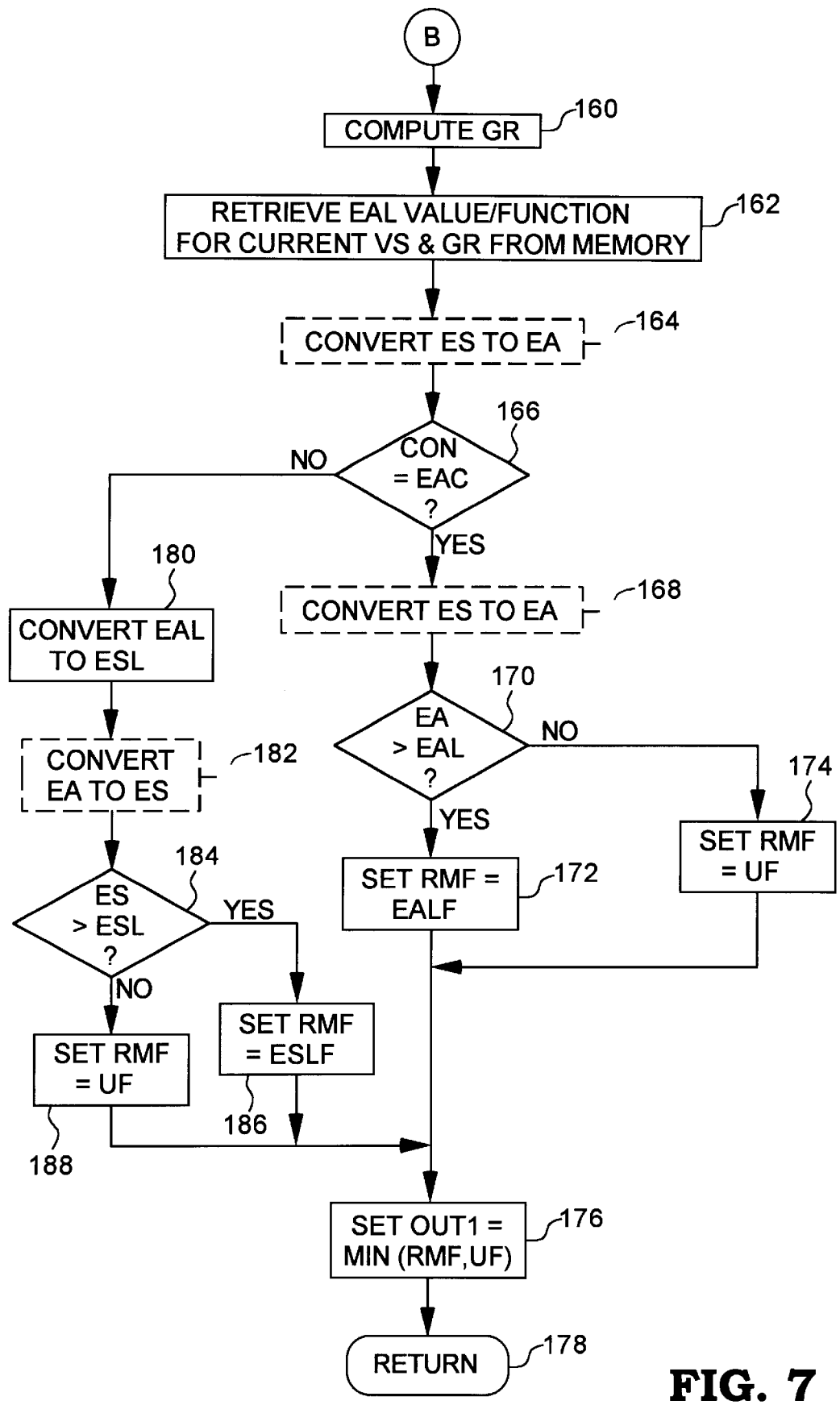
FIG. 7 is a flowchart illustrating one preferred embodiment of subroutine B of FIG. 5.

Referring now to FIGS. 5–7, a flowchart is shown illustrating one preferred embodiment of a software algorithm 100, executable by control computer 12 or other auxiliary computer, for performing the vehicle and engine acceleration governing operation of the present invention with either of the governor embodiments 35' or 35" of FIGS. 3A and 3B. Algorithm 100 starts at step 102 and at step 104 control computer 12 tests the RMG ENABLE value to determine whether the rate management governor RMG (74 or 84) is enabled for operation. If not, then either the torque request signal supplied to the Driver Requested Torque block 76 is a signal dominated by computer 12 and not the accelerator signal supplied by accelerator pedal 26, or the acceleration rate management algorithm of the present invention has been disabled via a service/recalibration tool, and algorithm execution continues at step 106 where computer 12 sets the CON value to NONE. Algorithm execution continues therefrom at step 114.

If, at step 104, computer 12 determines that the rate management governor (RMG) is enabled, algorithm execution continues at step 108 where computer 12 tests the current vehicle speed signal VS. If VS is greater than or equal to a valid vehicle speed threshold $VS_{THRESH}$, then VS is a valid vehicle speed and algorithm execution continues at step 112 where computer 12 sets the CON value to either VAC or VSP depending upon how the governor 35' (or 35") has been programmed via a service/recalibration tool to manage vehicle acceleration rates. If the governor 35' (or 35") has been so programmed to be responsive to vehicle acceleration, then computer 12 sets the CON value to VAC at step 112, thereby providing the RMG 74 (or 84) with an instruction to be responsive to vehicle acceleration. If, on the other hand, the governor 35' (or 35") has been programmed to be responsive to vehicle speed, then computer 12 sets the CON value to VSP at step 112, thereby providing the RMG 74 (or 84) with an instruction to be responsive to vehicle speed. In either case, algorithm execution continues from step 112 at step 114.

If, at step 108, computer 12 determines that the vehicle speed signal VS is less than the vehicle speed threshold value $VS_{THRESH}$, then the vehicle speed sensor 24 is not providing a valid vehicle speed signal and algorithm execution continues at step 110 where computer 12 sets the CON value to either EAC or ESP, thereby instructing the RMG 74 (or 84) to manage engine acceleration rates. If the governor 35' (or 35") has been programmed to be responsive to engine acceleration, then computer 12 sets the CON value to EAC at step 110, thereby providing the RMG 74 (or 84) with an instruction to be responsive to engine acceleration. If, on the other hand, the governor 35' (or 35") has been programmed to be responsive to engine speed, then computer 12 sets the CON value to ESP at step 110, thereby providing the RMG 74 (or 84) with an instruction to be responsive to engine speed. In either case, algorithm execution continues from step 112 at step 114.

At step 114, computer 12 tests the CON value and, if CON=NONE, algorithm execution continues at step 116 where the RMG 74 (or 84) sets the rate management fueling value RMF equal to the user fueling value UF provided by the Driver Requested Torque Block 76. Algorithm execution continues from step 116 at step 118 where computer 12 sets the fueling signal OUT1 equal to the minimum of either the rate management fueling value RMF or the user fueling value UF. Algorithm execution continues from step 118 at step 120 where algorithm execution returns to its calling routine (or alternatively loops back to step 102). Thus, if CON=NONE, then the RMG block is effectively disabled and the user fueling value UF is passed to fueling system 30 as the fueling signal OUT1.

If, at step 114, computer 12 determines that the CON value is not equal to NONE, then algorithm execution continues at step 122 where computer 12 again tests the CON value. If, at step 122, the CON=VAC or VSP, then the RMG 75 (or 84) is instructed to control vehicle acceleration rates, and algorithm execution continues at step 124 where subroutine A is called. If, at step 122, computer 12 determines that CON is not equal to VAC or VSP, then CON must be equal to either EAC or ESP, and the RMG 74 (or 84) is instructed to control engine acceleration rates, and algorithm execution continues at step 126 where subroutine B is called. Algorithm execution continues from either of steps 124 or 126 at step 125 where the algorithm 100 returns to its calling routine (or alternatively loops back to step 102).

Referring now to FIG. 6, a flowchart illustrating one preferred embodiment of a software algorithm for subroutine A of step 124 (FIG. 5), is shown. Subroutine A begins at step 128 where computer 12 computes or otherwise determines the currently engaged gear ratio (GR) in accordance with any of the techniques described hereinabove. Thereafter at step 130, computer 12 retrieves a vehicle acceleration limit function value VAL from memory 15 for the current vehicle speed VS and currently engaged gear ratio GR in accordance with any of the techniques described hereinabove. For governor 35', subroutine execution continues from step 130 at step 132 where computer 12 converts the current vehicle speed value VS to a vehicle acceleration value VA via acceleration calculation block 72, and execution continues therefrom at step 134. For governor 35", on the other hand, computer 12 skips step 132 and subroutine execution continues from step 130 at step 134.

At step 134, computer 12 tests the CON value and, if CON=VAC, then governor 35' (or 35") has been programmed to be responsive to vehicle acceleration. For governor 35", algorithm execution continues from step 134 at step 136 where computer 12 converts the current vehicle speed value VS to a vehicle acceleration value VA via differentiation block 86, and subroutine execution continues therefrom at step 138. In governor 35', on the other hand, computer 12 skips step 136, having computed VA at step 132, and proceeds directly to step 138.

At step 138, computer 12 tests the current vehicle acceleration value VA against the current vehicle acceleration limit function value VAL. If, at step 138, VA is less than or equal to VAL, then the current vehicle acceleration rate is acceptable and subroutine execution continues at step 142 where the rate management fueling value RMF is set equal to the user fueling value UF provided by Driver Requested Torque Block 76, and subroutine execution continues therefrom at step 144. If, at step 138, computer 12 determines that VA is greater than VAL, then the current vehicle acceleration value has exceeded the predefined vehicle acceleration function value and subroutine execution continues therefrom at step 140 where computer 12 sets the rate management fueling value RMF equal to a vehicle acceleration limit fueling value VALF, wherein VALF is a fueling value at which the resulting vehicle acceleration VA will not exceed the current vehicle acceleration limit function value VAL, and wherein system 10 utilizes known closed-loop control techniques (i.e. PID, etc.) to maintain the VALF value and thereby limit the vehicle acceleration rate to VAL. Subroutine execution continues from step 140 at step 144 where computer 12 sets the engine fueling signal OUT1 equal to the minimum value of the rate management fueling value RMF and the user fueling value UF, whereafter subroutine execution continues at step 146 by returning to step 124 of algorithm 100 of FIG. 5.

If, at step 134, computer 12 determines that CON is not equal to VAC, then CON must be equal to VSP and the governor 35' (or 35") has therefore been programmed to be responsive to vehicle speed, and subroutine execution continues at step 148 where computer 12 converts the vehicle acceleration limit value VAL to a vehicle speed limit value VSL. In both governors 35' and 35", computer 12 carries out step 148 by enabling integration block 80 to thereby convert the acceleration-based value to a speed-based value. With governor 35', subroutine execution continues from step 148 at step 150 where computer 12 converts the current vehicle acceleration value VA back to a vehicle speed value VS by enabling integration block 82. Subroutine execution continues therefrom at step 152. With governor 35", on the other hand, step 150 is unnecessary and computer 12 simply disables differentiation block 86 and passes the vehicle speed value VS directly into the RMG block 84. Subroutine execution thus advances from step 148 directly to step 152.

At step 152, computer 12 compares the current vehicle speed value VS to the current vehicle speed limit function VSL. If, at step 152, VS is greater than VSL, then the current vehicle speed value has exceeded the predefined vehicle speed function value and subroutine execution continues therefrom at step 154 where computer 12 sets the rate management fueling value RMF equal to a vehicle speed limit fueling value VSLF, wherein VSLF is a fueling value at which the resulting vehicle speed VS will not exceed the current vehicle speed limit function value VSL, and wherein system 10 utilizes known closed-loop control techniques (i.e. PID, etc.) to limit the vehicle acceleration rate by limiting vehicle speed to VSL. Subroutine execution continues from step 154 at step 144. If, on the other hand, computer 12 determines at step 152 that VS is less than or equal to VSL, then the current vehicle speed is less than the predefined vehicle speed limit function and subroutine execution continues at step 156 where computer 12 sets the rate management fueling value RMF equal to the user fueling value UF. Algorithm execution continues from step 156 at step 144.

Referring now to FIG. 7, a flowchart illustrating one preferred embodiment of a software algorithm for subroutine B of step 126 (FIG. 5), is shown. Subroutine B begins at step 160 where computer 12 computes or otherwise determines the currently engaged gear ratio (GR) in accordance with any of the techniques described hereinabove. If, however, computer 12 is configured to compute currently engaged gear ratio (GR) as a ratio of engine speed to vehicle speed, then computer 12 preferably carries out step 160 by setting GR equal to the numerically lowest gear ratio of transmission 16 since the vehicle speed value VS is less than $VS_{THRESH}$ and may therefore be invalid. Alternatively, computer 12 may carry out step 160 by setting GR equal to any one of a number of numerically low gear ratios of transmission 16. Thereafter at step 162, computer 12 retrieves an engine acceleration limit function value EAL from memory 15 for the current vehicle speed VS and currently engaged gear ratio GR in accordance with any of the techniques described hereinabove. For governor 35', subroutine execution continues from step 162 at step 164 where computer 12 converts the current engine speed value ES to an engine acceleration value EA via acceleration calculation block 72, and execution continues therefrom at step 166. For governor 35", on the other hand, computer 12 skips step 164 and subroutine execution continues from step 162 at step 166.

At step 166, computer 12 tests the CON value and, if CON=EAC, then governor 35' (or 35") has been programmed to be responsive to engine acceleration. For governor 35", algorithm execution continues from step 166 at step 168 where computer 12 converts the current engine speed value ES to an engine acceleration value EA via differentiation block 86, and subroutine execution continues therefrom at step 170. In governor 35', on the other hand, computer 12 skips step 168, having computed EA at step 164, and proceeds directly to step 170.

At step 170, computer 12 tests the current engine acceleration value EA against the current engine acceleration limit function value EAL. If, at step 170, EA is less than or equal to EAL, then the current engine acceleration rate is acceptable and subroutine execution continues at step 174 where the rate management fueling value RMF is set equal to the user fueling value UF provided by Driver Requested Torque Block 76, and subroutine execution continues therefrom at step 176. If, at step 170, computer 12 determines that EA is greater than EAL, then the current engine acceleration value has exceeded the predefined engine acceleration function value and subroutine execution continues therefrom at step 172 where computer 12 sets the rate management fueling value RMF equal to an engine acceleration limit fueling value EALF, wherein EALF is a fueling value at which the resulting engine acceleration EA will not exceed the current engine acceleration limit function value EAL, and wherein system 10 utilizes known closed-loop control techniques (i.e. PID, etc.) to limit the engine acceleration rate to EAL. Subroutine execution continues from step 172 at step 176 where computer 12 sets the engine fueling signal OUT1 equal to the minimum value of the rate management fueling value RMF and the user fueling value UF, whereafter subroutine execution continues at step 178 by returning to step 126 of algorithm 100 of FIG. 5.

If, at step 166, computer 12 determines that CON is not equal to EAC, then CON must be equal to ESP and the governor 35' (or 35") has therefore been programmed to be responsive to engine speed, and subroutine execution continues at step 180 where computer 12 converts the engine acceleration limit value EAL to an engine speed limit value ESL. In both governors 35' and 35", computer 12 carries out step 180 by enabling integration block 80 to thereby convert the acceleration-based value to a speed-based value. With governor 35', subroutine execution continues from step 180 at step 182 where computer 12 converts the current engine acceleration value EA back to an engine speed value ES by enabling integration block 82. Subroutine execution continues therefrom at step 184. With governor 35", on the other hand, step 182 is unnecessary and computer 12 simply disables differentiation block 86 and passes the engine speed value ES directly into the RMG block 84. Subroutine execution thus advances from step 180 directly to step 184.

At step 184, computer 12 compares the current engine speed value ES to the current engine speed limit function ESL. If, at step 184, ES is greater than ESL, then the current engine speed value has exceeded the predefined engine speed function value and subroutine execution continues therefrom at step 186 where computer 12 sets the rate management fueling value RMF equal to an engine speed limit fueling value ESLF, wherein ESLF is a fueling value at which the resulting engine speed ES will not exceed the current engine speed limit function value ESL, and wherein system 10 utilizes known closed-loop control techniques (i.e. PID, etc.) to limit the engine acceleration rate by limiting engine speed to ESL. Subroutine execution continues from step 186 at step 176. If, on the other hand, computer 12 determines at step 184 that ES is less than or equal to ESL, then the current engine speed is less than the predefined engine speed limit function and subroutine execution continues at step 188 where computer 12 sets the rate management fueling value RMF equal to the user fueling value UF. Algorithm execution continues from step 188 at step 176.

Although the governor embodiments 35' and 35" illustrated in FIGS. 3A and 3B have been described herein as enabling engine acceleration rate management only when the vehicle speed signal VS is, or may be, invalid (VS less than or equal to $VS_{THRESH}$), it is to be understood that the present invention contemplates that RM REF 70 may alternatively be configured to instruct RMG 74 or RMG 84 to provide for engine acceleration rate management in any vehicle speed range; valid, invalid and/or both.

Referring now to FIG. 3C, another alternative embodiment 35''' of the governor 35 of FIG. 1, in accordance with another aspect of the present invention, is shown. Governor 35''' is identical in many respects to governor 35' of FIG. 3A, and differs only in that the RM REF block 88 does not receive an engine speed signal ES, and the vehicle and engine acceleration values VA and EA provided to RMG 74 via acceleration calculation block 72 are replaced with a single vehicle acceleration signal VA which is provided to control computer 12 via acceleration sensor/system 46. Since governor 35''' does not rely on vehicle speed provided by a vehicle speed sensor to determine vehicle acceleration, governor 35''' need not perform any special signal processing at low vehicle speeds (VS less than $VS_{THRESH}$) when the vehicle speed may be invalid. Instead, governor 35''' obtains vehicle acceleration directly from acceleration sensor/system 46 and may therefore be responsive only to either vehicle acceleration or vehicle speed to govern vehicle acceleration, depending upon the programming of the CON value, over all possible vehicle speeds.

Figure 8:
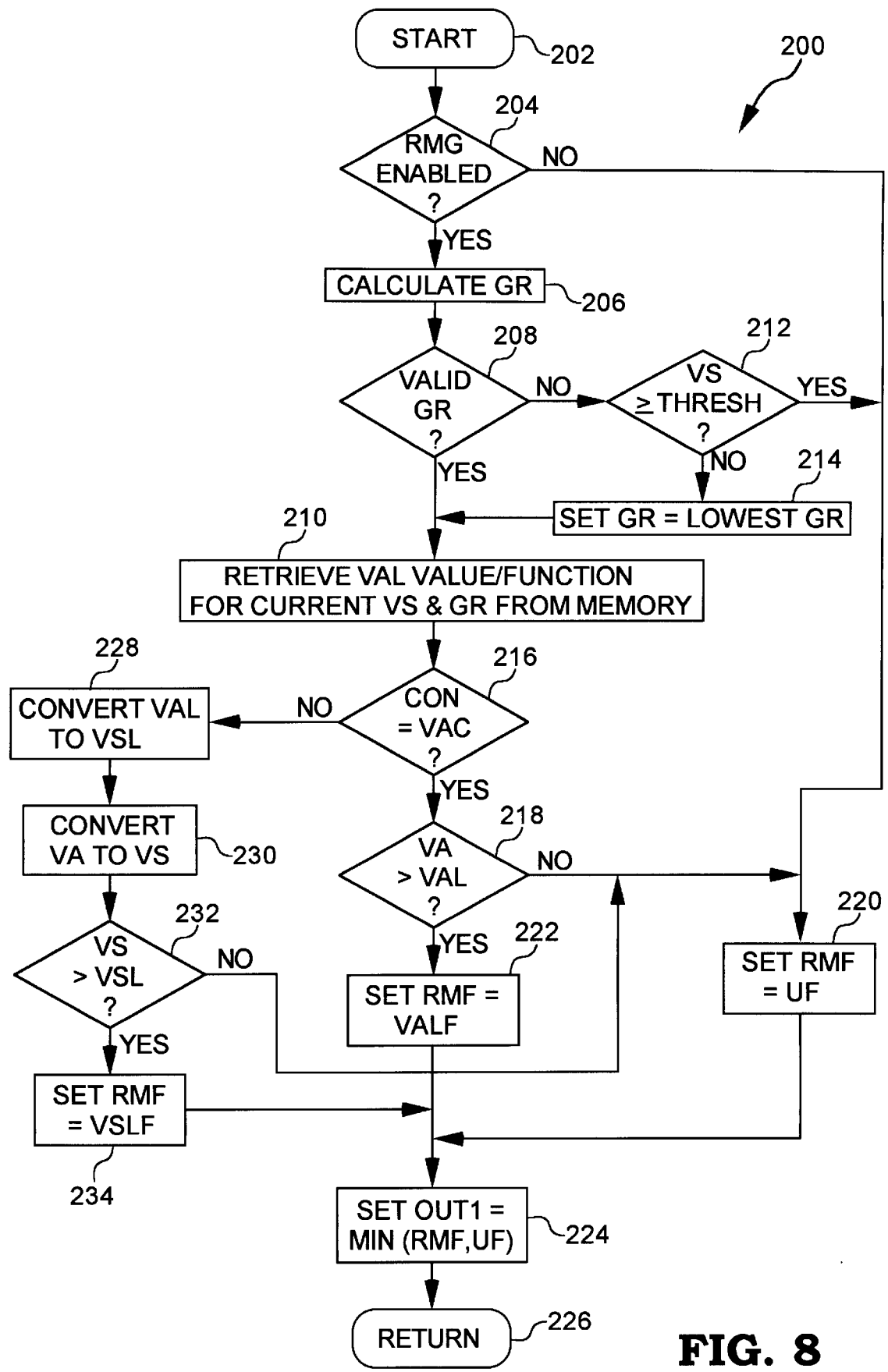
FIG. 8 is a flowchart illustrating an alternate embodiment of a software algorithm executable by the control computer of FIG. 1 for controlling vehicle/engine acceleration in accordance with the present invention.

Referring now to FIG. 8, a flowchart illustrating one preferred embodiment of a software algorithm 200, executable by control computer 12 or other auxiliary computer, for controlling vehicle acceleration in accordance with governor 35''', is shown. Algorithm 200 begins at step 202, and at step 204, control computer 12 tests the RMG ENABLE value to determine whether the rate management governor 74 is enabled for operation as discussed hereinabove. If, at step 204, control computer 12 determines from the RMG ENABLE value that the RMG 74 is disabled, algorithm execution continues at step 220. If, on the other hand, control computer 12 determines at step 204 that the RMG 74 is enabled, algorithm execution continues at step 206 where control computer 12 calculates or computes the currently engaged gear ratio in accordance with any of the techniques described hereinabove.

If control computer 12 is configured to compute currently engaged gear ratio as a ratio of engine speed and vehicle speed, then algorithm execution continues from step 206 at step 208 where computer 12 tests GR to determine whether GR is a valid gear ratio. If control computer 12 is configured to compute currently engaged gear ratio (GR) as a ratio of engine speed and vehicle speed, such a computation may produce an invalid gear ratio if vehicle speed is below $VS_{THRESH}$, wherein such vehicle speed values may be invalid. If, at step 208, computer 12 determines that GR is not a valid gear ratio, algorithm execution continues at step 212 where the vehicle speed (VS) is tested against the valid vehicle speed threshold $VS_{THRESH}$. If, at step 212, VS is greater than $VS_{THRESH}$, then VS is valid and either a fault exists somewhere in the vehicle drivetrain or the transmission 16 is currently undergoing a shift. In either case, algorithm execution continues therefrom at step 220. If, on the other hand, computer 12 determines at step 212 that VS is less than or equal to $VS_{THRESH}$, then the invalid gear ratio calculation is due to an invalid vehicle speed value and algorithm execution continues at step 214 where computer 12 preferably sets GR equal to the numerically lowest gear ratio of transmission 16. Alternatively, computer 12 may carry out step 214 by setting GR equal to any of a number of numerically low gear ratios of transmission 16. In any case, algorithm execution continues from step 214 at step 210. It bears pointing out here that if control computer 12 is configured to compute currently engaged gear ratio in accordance with any technique not requiring a valid vehicle speed signal, then steps 208, 212 and 214 may be omitted and step 206 may advance directly to step 210.

At step 210, computer 12 retrieves a vehicle acceleration limit function value or function VAL from memory 15 for the current vehicle speed VS and currently engaged gear ratio GR in accordance with any of the techniques described hereinabove. Thereafter at step 216, computer 12 tests the CON value and, if CON=VAC, then governor 35''' has been programmed to be responsive to vehicle acceleration, and algorithm accordingly continues at step 218. At step 218, computer 12 tests the current vehicle acceleration value VA against the current vehicle acceleration limit function value VAL. If, at step 218, VA is less than or equal to VAL, then the current vehicle acceleration rate is acceptable and subroutine execution continues at step 220 where the rate management fueling value RMF is set equal to the user fueling value UF provided by road speed governor 76, and subroutine execution continues therefrom at step 224. If, at step 218, computer 12 determines that VA is greater than VAL, then the current vehicle acceleration value has exceeded the predefined vehicle acceleration function value and subroutine execution continues therefrom at step 222 where computer 12 sets the rate management fueling value RMF equal to a vehicle acceleration limit fueling value VALF, wherein VALF is a fueling value at which the resulting vehicle acceleration VA will not exceed the current vehicle acceleration limit function value VAL, and wherein system 10 utilizes known closed-loop control techniques (i.e. PID, etc.) to limit the vehicle acceleration rate to VAL. Subroutine execution continues from step 222 at step 224 where computer 12 sets the engine fueling signal OUT1 equal to the minimum value of the rate management fueling value RMF and the user fueling value UF, whereafter subroutine execution continues at step 226 by returning to its calling routine (or alternatively loops back to step 202).

If, at step 216, computer 12 determines that CON is not equal to VAC, then CON must be equal to VSP and the governor 35''' has therefore been programmed to be responsive to vehicle speed, and subroutine execution continues at step 228 where computer 12 converts the vehicle acceleration limit value VAL to a vehicle speed limit value VSL by enabling integration block 80 to thereby convert the acceleration-based value to a speed-based value. Thereafter at step 230, computer 12 converts the current vehicle acceleration value VA to a vehicle speed value VS by enabling integration block 82. Algorithm execution continues from step 230 at step 232 where computer 12 compares the current vehicle speed value VS to the current vehicle speed limit function VSL. If, at step 232, VS is greater than VSL, then the current vehicle speed value has exceeded the predefined vehicle speed function value and subroutine execution continues therefrom at step 234 where computer 12 sets the rate management fueling value RMF equal to a vehicle speed limit fueling value VSLF, wherein VSLF is a fueling value at which the resulting vehicle speed VS will not exceed the current vehicle speed limit function value VSL, and wherein system 10 utilizes known closed-loop control techniques (i.e. PID, etc.) to limit the vehicle acceleration rate by limiting vehicle speed to VSL. Subroutine execution continues from step 234 at step 224. If, on the other hand, computer 12 determines at step 232 that VS is less than or equal to VSL, then the current vehicle speed is less than the predefined vehicle speed limit function and subroutine execution continues at step 220 where computer 12 sets the rate management fueling value RMF equal to the user fueling value UF. Algorithm execution continues from step 220 at step 224.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected. For example, it should be understood that while any of the vehicle/engine acceleration rate management algorithms of the present invention have been described as being executable by control computer 12, such algorithms may alternatively be executed by microprocessor 44 or any other auxiliary computer connected to datalink 42, wherein appropriate fuel information (RMF or UF) is supplied to control computer 12 via the datalink 42. As another example, the present invention contemplates providing for one or more driver actuatable switches for switching between multiple vehicle/engine acceleration rate limiting functions, wherein such multiple functions may vary in their acceleration limiting severity. Additionally or alternatively, one or more driver actuatable switches may be provided to enable/disable vehicle/engine acceleration rate limiting in one or more vehicle speed ranges (or such enablement/disablement may be programmable via a known service/recalibration tool). As yet another example, if transmission 16 is an automatic or manual/automatic transmission, a "driver requested torque" message, corresponding herein to UF, may be broadcast by control computer 12 over the datalink 42, and microprocessor 44 may be responsive to such a message to control shift points of one or more of the automatically selectable transmission gear ratios. In such cases, it should be understood that, while executing any of the acceleration rate management algorithms of the present invention, control computer 12 should alter the "driver requested torque" message to correspond to RMF when RMF is provided as the fueling signal at OUT1. This will insure that microprocessor 44 will compute transmission shift points corresponding to RMF rather than UF.

What is claimed is:

1. A vehicle acceleration rate management system comprising:
    means for determining acceleration rate of a vehicle and producing a vehicle acceleration signal corresponding thereto;
    a memory storing a vehicle acceleration limit function therein;
    a fuel system responsive to a fueling signal to provide fuel to an internal combustion engine of the vehicle; and
    a control computer producing said fueling signal, said control computer responsive to said vehicle acceleration signal and said vehicle acceleration limit function to control vehicle acceleration by limiting said fueling signal whenever said vehicle acceleration signal exceeds said vehicle acceleration limit function.

2. The vehicle acceleration rate management system of claim 1 further including:
    an accelerator responsive to manual actuation thereof to produce an accelerator signal;
    and wherein said control computer is operable to generate a torque request signal independently of said accelerator signal, said computer responsive to either of said accelerator signal and said torque request signal to produce said fueling signal, said control computer limiting said fueling signal only when said fueling signal is produced in accordance with said accelerator signal.

3. The vehicle acceleration rate management system of claim 1 further including:
    a transmission connected to said internal combustion engine and having a number of selectable gear ratios engageable with said engine; and
    means for determining a currently engaged gear ratio and producing a gear ratio signal corresponding thereto;
    wherein said memory unit includes a number of vehicle acceleration limit functions stored therein, each of said number of vehicle acceleration limit functions corresponding to one or more of said number of selectable gear ratios;
    and wherein said control computer is responsive to said gear ratio signal to limit said fueling signal in accordance with a corresponding one of said number of vehicle acceleration limit functions.

4. The vehicle acceleration rate management system of claim 1 further including:
    means for sensing vehicle speed and producing a vehicle speed signal corresponding thereto;
    wherein said vehicle acceleration limit function includes a number of vehicle acceleration limit values each corresponding to one of a number of vehicle speed ranges;

and wherein said control computer is responsive to said vehicle speed signal to determine a corresponding one of said number of vehicle speed ranges and select a corresponding one of said number of vehicle acceleration limit values, said control computer limiting said fueling signal in accordance with said selected one of said number of vehicle acceleration limit values.

5. The vehicle acceleration rate management system of claim 1 wherein said means for determining vehicle acceleration includes:

means for sensing vehicle speed and producing a first vehicle speed signal corresponding thereto; and means within said control computer for converting said vehicle speed signal to said vehicle acceleration signal.

6. The vehicle acceleration rate management system of claim 5 wherein said control computer includes:

means for converting said vehicle acceleration limit function to a vehicle speed limit function; and means for converting said vehicle acceleration signal to a second vehicle speed signal;

and wherein said control computer is responsive to said vehicle speed limit function and said second vehicle speed signal to control vehicle acceleration by limiting said fueling signal to said predefined fueling function whenever said second vehicle speed signal exceeds said vehicle speed limit function.

7. The vehicle acceleration rate management system of claim 5 wherein said control computer includes means for converting said vehicle acceleration limit function to a vehicle speed limit function;

and wherein said control computer is responsive to said vehicle speed limit function and said first vehicle speed signal to control vehicle acceleration by limiting said fueling signal to said predefined fueling function whenever said first vehicle speed signal exceeds said vehicle speed limit function.

8. The vehicle acceleration rate management system of claim 1 wherein said means for determining vehicle acceleration includes means for sensing vehicle acceleration and producing a vehicle acceleration signal corresponding thereto.

9. The vehicle acceleration rate management system of claim 8 wherein said control computer includes:

means for converting said vehicle acceleration limit function to a vehicle speed limit function; and means for converting said vehicle acceleration signal to a vehicle speed signal;

and wherein said control computer is responsive to said vehicle speed limit function and said vehicle speed signal to control vehicle acceleration by limiting said fueling signal to said predefined fueling function whenever said vehicle speed signal exceeds said vehicle speed limit function.

10. An engine acceleration rate management system comprising:

means for determining an acceleration rate of an internal combustion engine and producing an engine acceleration signal corresponding thereto;

a memory storing an engine acceleration limit function therein;

a fuel system responsive to a fueling signal to provide fuel to the internal combustion engine; and a control computer producing said fueling signal, said control computer responsive to said engine acceleration signal and said engine acceleration limit function to control engine acceleration by limiting said fueling signal whenever said engine acceleration signal exceeds said engine acceleration limit function.

11. The engine acceleration rate management system of claim 10 further including:

an accelerator responsive to manual actuation thereof to produce an accelerator signal;

and wherein said control computer is operable to generate a torque request signal independently of said accelerator signal, said computer responsive to either of said accelerator signal and said torque request signal to produce said fueling signal, said control computer limiting said fueling signal to said predefined fueling function only when said fueling signal is produced in accordance with said accelerator signal.

12. The engine acceleration rate management system of claim 10 further including:

a transmission connected to said internal combustion engine and having a number of selectable gear ratios engageable with said engine; and means for determining a currently engaged gear ratio and producing a gear ratio signal corresponding thereto;

wherein said memory unit includes a number of engine acceleration limit functions stored therein, each of said number of engine acceleration limit functions corresponding to one or more of said number of selectable gear ratios;

and wherein said control computer is responsive to said gear ratio signal to limit said fueling signal in accordance with a corresponding one of said number of engine acceleration limit functions.

13. The engine acceleration rate management system of claim 10 further including:

means for sensing engine speed and producing an engine speed signal corresponding thereto;

wherein said engine acceleration limit function includes a number of engine acceleration limit values each corresponding to one of a number of engine speed ranges;

and wherein said control computer is responsive to said engine speed signal to determine a corresponding one of said number of engine speed ranges and select a corresponding one of said number of engine acceleration limit values, said control computer limiting said fueling signal in accordance with said selected one of said number of engine acceleration limit values.

14. The engine acceleration rate management system of claim 10 wherein said means for determining engine acceleration includes:

means for sensing engine speed and producing a first engine speed signal corresponding thereto; and means within said control computer for converting said engine speed signal to said engine acceleration signal.

15. The engine acceleration rate management system of claim 14 wherein said control computer includes:

means for converting said engine acceleration limit function to a engine speed limit function; and means for converting said engine acceleration signal to a second engine speed signal;

and wherein said control computer is responsive to said engine speed limit function and said second engine speed signal to control vehicle acceleration by limiting said fueling signal to said predefined fueling function whenever said second engine speed signal exceeds said engine speed limit function.

16. The engine acceleration rate management system of claim 14 wherein said control computer includes means for converting said engine acceleration limit function to an engine speed limit function;

and wherein said control computer is responsive to said engine speed limit function and said first engine speed signal to control engine acceleration by limiting said fueling signal to said predefined fueling function whenever said first engine speed signal exceeds said engine speed limit function.

17. A vehicle/engine acceleration rate management system comprising:

means for sensing speed of a vehicle and producing a valid vehicle speed signal above a threshold vehicle speed and an invalid vehicle speed signal below said threshold vehicle speed;

means responsive to said valid vehicle speed signal for producing a vehicle acceleration signal corresponding to an acceleration rate of the vehicle;

means for producing an engine acceleration signal corresponding to an acceleration rate of an internal combustion engine of the vehicle;

a fuel system responsive to a fueling signal to provide fuel to the internal combustion engine; and means responsive to said valid vehicle speed signal for controlling vehicle acceleration by accordingly limiting said fueling signal whenever said vehicle acceleration signal exceeds a vehicle acceleration limiting function, and further responsive to said invalid vehicle speed signal for controlling engine acceleration by correspondingly limiting said fueling signal whenever said engine acceleration signal exceeds an engine acceleration function.

18. The vehicle/engine acceleration rate management system of claim 17 further including:

an accelerator responsive to manual actuation thereof to produce an accelerator signal; and a control computer operable to generate a torque request signal independently of said accelerator signal, and responsive to either of said accelerator signal and said torque request signal to produce said fueling signal, said means for controlling vehicle and engine acceleration limiting said fueling signal only when said fueling signal is produced in accordance with said accelerator signal.

19. The vehicle/engine acceleration rate management system of claim 17 further including:

a transmission connected to said internal combustion engine and having a number of selectable gear ratios engageable with said engine; and means for determining a currently engaged gear ratio and producing a gear ratio signal corresponding thereto;

wherein said means for controlling vehicle and engine acceleration is responsive to said gear ratio signal to limit said fueling signal according to the currently engaged gear ratio.

20. The vehicle/engine acceleration rate management system of claim 19 wherein said means for producing an engine acceleration signal includes:

means for sensing engine speed and producing an engine speed signal corresponding thereto; and means for converting said engine speed signal to said engine acceleration signal.

21. The vehicle/engine acceleration rate management system of claim 20 wherein said means for determining a currently engaged gear ratio is responsive to said valid vehicle speed signal and said engine speed signal to determine said currently engaged gear ratio as a ratio thereof, and further responsive to said invalid vehicle speed signal to assign a numerically low one of said number of selectable gear ratios as the currently engaged gear ratio.

22. A vehicle/engine acceleration rate management system comprising:

an accelerator responsive to manual actuation thereof to produce an accelerator signal;

a fuel system responsive to a fueling signal to provide fuel to an internal combustion engine of a vehicle; and a control computer operable to generate a torque request signal independently of said accelerator signal, said computer responsive to either of said accelerator signal and said torque request signal to produce said fueling signal, said computer including means for limiting said fueling signal to thereby limit acceleration of one of the vehicle and the internal combustion engine only when said fueling signal is produced in accordance with said accelerator signal.

* * * * *